(12) United States Patent
Tang et al.

(10) Patent No.: US 10,505,464 B2
(45) Date of Patent: Dec. 10, 2019

(54) COMMUNICATION PROTOCOL CIRCUIT AND DISCRETE-TIME CURRENT SENSE CIRCUIT AND METHOD THEREOF

(71) Applicant: RICHTEK TECHNOLOGY CORPORATION, Zhubei, Hsinchu (TW)

(72) Inventors: Chien-Fu Tang, Hsinchu (TW); Hsin-Yi Wu, Taipei (TW); Isaac Y. Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/219,831

(22) Filed: Dec. 13, 2018

(65) Prior Publication Data

US 2019/0296651 A1 Sep. 26, 2019

Related U.S. Application Data

(60) Provisional application No. 62/647,805, filed on Mar. 25, 2018.

(30) Foreign Application Priority Data

Sep. 13, 2018 (CN) .......................... 2018 1 1066313

(51) Int. Cl.
*H02M 3/335* (2006.01)
*H02M 1/00* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .......... H02M 3/335–33592; H02M 2001/0009
See application file for complete search history.

(56) References Cited

U.S. PATENT DOCUMENTS

| 2013/0083566 | A1* | 4/2013 | Gaknoki | H02M 3/33515 363/21.17 |
|---|---|---|---|---|
| 2016/0020700 | A1* | 1/2016 | Zhang | H02M 3/33576 363/21.16 |
| 2016/0056724 | A1* | 2/2016 | Valley | H02M 3/33523 363/21.12 |
| 2017/0264211 | A1* | 9/2017 | Christiaans | H02M 7/219 |
| 2017/0346385 | A1* | 11/2017 | Liang | H02M 3/156 |

* cited by examiner

*Primary Examiner* — Yusef A Ahmed
*Assistant Examiner* — Sisay G Tiku
(74) *Attorney, Agent, or Firm* — Tung & Associates (57) ABSTRACT

A discrete-time current sense circuit includes: a current mirror circuit, which includes: a power switch, for providing the communication current; and a sampling switch, which is for sampling the communication protocol current in a sampling period in a discrete manner, to generate a sampling current; a bias circuit, for providing a reference voltage to the reference node in the sampling period according to a communication protocol voltage of the communication protocol voltage node; a signal conversion circuit, for generating the discrete-time current sense signal according to the sampling current; and a first switch, for operating to determine the sampling period; wherein the sampling period is part of a complete period in which the power switch provides the communication protocol current.

15 Claims, 7 Drawing Sheets

COMMUNICATION PROTOCOL CIRCUIT AND DISCRETE-TIME CURRENT SENSE CIRCUIT AND METHOD THEREOF

CROSS REFERENCE

The present invention claims priority to U.S. 62/647,805, filed on Mar. 25, 2018, and to CN 201811066313.1, Sep. 13, 2018.

BACKGROUND OF THE INVENTION

Field of Invention

The present invention relates to a communication protocol circuit and a discrete-time current sense circuit and a discrete-time current sense method thereof. Particularly it relates to such a communication protocol circuit which samples a protocol current by the discrete-time current sense method. The present invention also relates to the discrete-time current sense circuit and the discrete-time current sense method for use in the communication protocol circuit.

Description of Related Art

Figure 1:
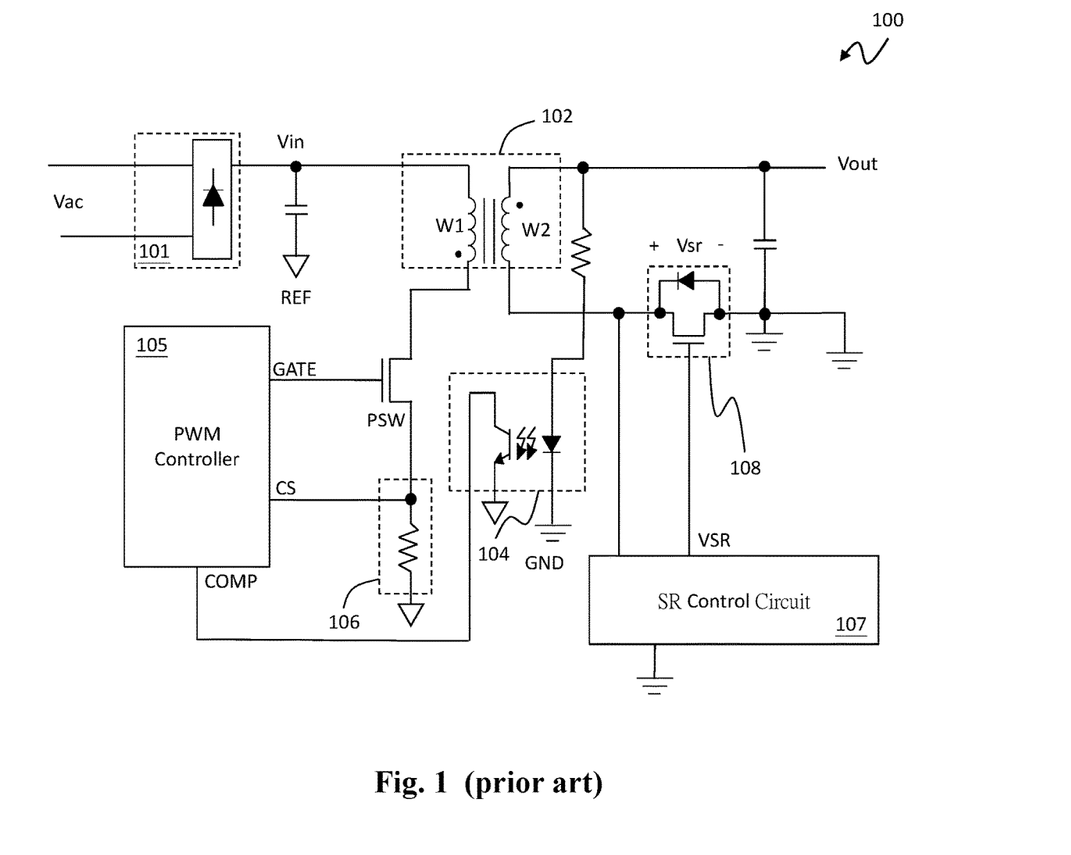
FIG. 1 shows a schematic diagram of a prior art flyback power converter 100.

FIG. 1 shows a schematic diagram of a conventional flyback power converter 100. As shown in FIG. 1, a rectifier circuit 101 rectifies an alternating current (AC) voltage Vac to generate an input voltage Vin. The rectifier circuit 101 is for example a bridge rectifier circuit. A primary winding W1 at a primary side of a transformer 102 of the flyback power converter 100 receives the input voltage Vin. A power switch PSW controls a conduction time of the primary winding W1, and the input voltage Vin is converted to an output voltage Vout which is generated by a secondary winding W2 at a secondary side of the transformer 102. The power switch PSW at the primary side is controlled by a pulse width modulation (PWM) controller 105. The flyback power converter 100 includes the aforementioned rectifier circuit 101, the transformer 102, the power switch PSW, an opto-coupler circuit 104, the PWM controller 105, a current sense circuit 106, a synchronous rectification (SR) control circuit 107, and an SR switch circuit 108. The PWM controller 105 generates a PWM signal according to a feedback voltage signal COMP and a current sense signal CS, wherein the feedback voltage signal COMP is related to the output voltage Vout or an output current, and the current sense signal CS is generated by the current sense circuit 106, which is related to a current flowing through the power switch PSW. The feedback voltage signal COMP is for example generated by the opto-coupler circuit 104 (or, alternatively, generated by an auxiliary winding which is not shown). The PWM controller 105 further generates a switch control signal GATE according to the PWM signal, to control the power switch PSW for converting the input voltage Vin to the output voltage Vout. For better power conversion efficiency, the secondary winding W2 of the flyback power converter 100 is electrically connected to the SR switch circuit 108. The SR control circuit 107 controls the SR switch circuit 108 according to a voltage drop across the SR switch circuit 108. As such, the secondary winding W2 is controlled to be conductive while the primary winding W1 is nonconductive, for converting the input voltage Vin to the output voltage Vout.

Figure 2:
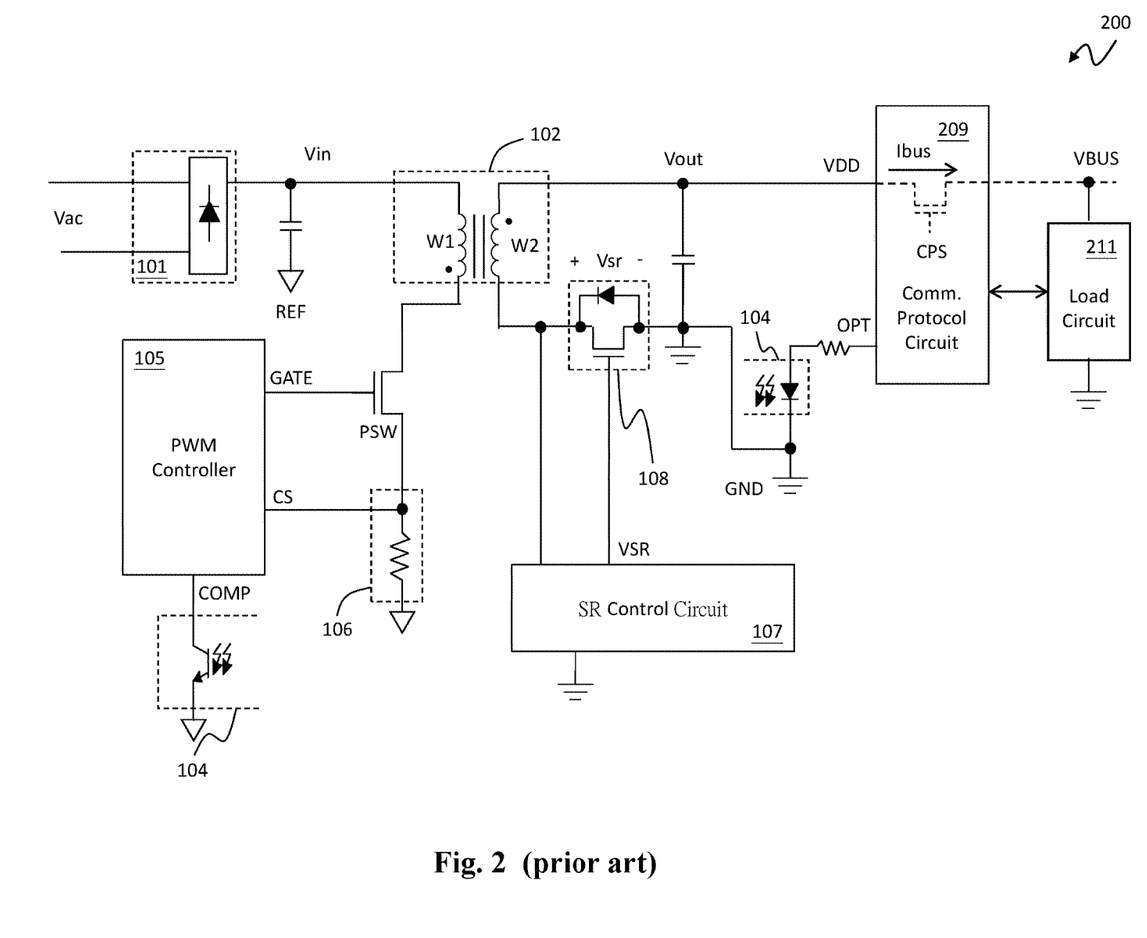
FIG. 2 shows a schematic diagram of another prior art flyback power converter 200.

FIG. 2 shows a schematic diagram of another prior art flyback power converter 200. As shown in FIG. 2, the flyback power converter 200 is different from the flyback power converter 100 in that, the flyback power converter 200 further includes a communication protocol circuit 209. When the flyback power converter 200 is used as a charger (such as an AC power adaptor), the communication protocol circuit 209 exchanges information with a load circuit 211 (which is, for example, a rechargeable battery), to generate a communication protocol signal CPS, so as to determine whether or not to provide a communication protocol current Ibus to the load circuit 211, and provide a charging power by a communication protocol voltage node VBUS of the communication protocol circuit 209. The communication protocol circuit 209 checks whether the charging power provided by the flyback power converter 200 matches charging power specification and requirement of the load circuit 211 which is coupled to the communication protocol voltage node VBUS, so as to avoid damaging the flyback power converter 200 and/or the load circuit 211.

The communication protocol circuit 209 for example conforms to a communication protocol such USBPD, QC, and PumpExpress, etc. The flyback power converter 200 is different from the flyback power converter 100 in that, in the flyback power converter 100 shown in FIG. 1, the feedback voltage signal COMP is related to the output voltage Vout or an output current flowing through the secondary winding W2; while in the flyback power converter 200 shown in FIG. 2, the feedback voltage signal COMP is related to a communication protocol current Ibus flowing through a power switch (as indicated by a dashed power switch in the communication protocol circuit 209 shown in FIG. 2) which is coupled between an internal voltage node VDD of the communication protocol circuit 209 and a communication protocol voltage node VBUS.

In the prior art flyback power converter 200 shown in FIG. 2, there is a trade-off issue between accurately sensing the communication protocol current Ibus and low power loss.

In view of the above, the present invention proposes a communication protocol circuit and a discrete-time current sense circuit and a discrete-time current sense method thereof, which are capable of accurately sensing the communication protocol current Ibus with low power loss.

SUMMARY OF THE INVENTION

From one perspective, the present invention provides a communication protocol circuit for use in a flyback power converter, the communication protocol circuit comprising: an information exchange circuit, which is configured to operably exchange information with a load circuit, to generate a communication protocol signal, to thereby determine whether or not to provide a communication protocol current to the load circuit; and a discrete-time current sense circuit, which is coupled to the information exchange circuit, and is configured to operably generate a discrete-time current sense signal according to the communication protocol current; wherein the flyback power converter is configured to operably convert an input voltage to an output voltage according to the discrete-time current sense signal; wherein the discrete-time current sense circuit includes: a current mirror circuit, which includes: a power switch, which is coupled between an internal voltage node and a communication protocol voltage node, and is configured to operably provide the communication current; and a sampling switch, which is coupled between the internal voltage node and a reference node, and is configured to operably sample the communication protocol current in a sampling period in a discrete manner, to generate a sampling current; a bias circuit, which is coupled to the sampling switch, and is configured to operably provide a reference voltage to the reference node in the sampling period according to a communication protocol voltage of the communication protocol voltage node; a signal conversion circuit, which is coupled to the bias circuit, and is configured to operably generate the discrete-time current sense signal according to the sampling current; and a first switch, which is coupled to the sampling switch, and is configured to operate to determine the sampling period; wherein the sampling period is within, and is apart of, a complete period in which the power switch provides the communication protocol current.

From another perspective, the present invention provides a discrete-time current sense circuit for use in a communication protocol circuit, wherein the communication protocol circuit for use in a flyback power converter, and the communication protocol circuit includes an information exchange circuit, which is configured to operably exchange information with a load circuit, to generate a communication protocol signal, to thereby determine whether or not to provide a communication protocol current to the load circuit; and the discrete-time current sense circuit, which is coupled to the information exchange circuit, and is configured to operably generate a discrete-time current sense signal according to the communication protocol current; wherein the flyback power converter is configured to operably convert an input voltage to an output voltage according to the discrete-time current sense signal, and provide the communication protocol current; the discrete-time current sense circuit comprising: a current mirror circuit, which includes: a power switch, wherein the power switch is coupled between an internal voltage node and a communication protocol voltage node, and is configured to operably provide the communication current; and a sampling switch, which is coupled between the internal voltage node and a reference node, and is configured to operably sample the communication protocol current in a sampling period in a discrete manner, to generate a sampling current; a bias circuit, which is coupled to the sampling switch, and is configured to operably provide a reference voltage to the reference node in the sampling period according to a communication protocol voltage of the communication protocol voltage node; a signal conversion circuit, which is coupled to the bias circuit, and is configured to operably generate the discrete-time current sense signal according to the sampling current; and a first switch, which is coupled to the sampling switch, and is configured to operate to determine the sampling period; wherein the sampling period is within, and is apart of, a complete period in which the power switch provides the communication protocol current.

In one preferable embodiment, the discrete-time current sense circuit further includes a second switch, which is coupled to the signal conversion circuit, and is configured to operate to determine whether or not to convert the sampling current to the discrete-time current sense signal.

In one preferable embodiment, the reference voltage is equal to the communication protocol voltage.

In one preferable embodiment, the signal conversion circuit includes: a current-to-voltage conversion circuit, which is coupled to the sampling switch, and is configured to operably convert the sampling current to a sampling voltage; and a sample-and-hold circuit, which is coupled to the current-to-voltage conversion circuit, and is configured to operably sample and hold the sampling voltage, to generate the discrete-time current sense signal.

In one preferable embodiment, the signal conversion circuit includes: a signal conversion current mirror circuit, which is coupled to the sampling switch, and is configured to operably convert the sampling current to a conversion sampling current; and a sample-and-hold circuit, which is coupled to the signal conversion current mirror circuit, and is configured to operably sample and hold the conversion sampling current, to generate the discrete-time current sense signal.

From another perspective, the present invention provides a discrete-time current sense method for use in a communication protocol circuit, comprising: sampling a communication protocol current in a sampling period in a discrete manner, to generate a sampling current, wherein the communication protocol current is provided by a power switch which is coupled between an internal voltage node and a communication protocol voltage node; providing a reference voltage to a reference node in the sampling period according to a communication protocol voltage of the communication protocol voltage node, wherein the sampling current flows through the reference node; generating a discrete-time current sense signal according to the sampling current; and operating a first switch to determine the sampling period; wherein the sampling period is within, and is a part of, a complete period in which the power switch provides the communication protocol current.

In one preferable embodiment, the discrete-time current sense method further comprises operating a second switch to determine whether or not to convert the sampling current to the discrete-time current sense signal.

In one preferable embodiment, the reference voltage is equal to the communication protocol voltage.

In one preferable embodiment, the step of generating the discrete-time current sense signal according to the sampling current includes: converting the sampling current to a sampling voltage; and sampling and holding the sampling voltage, to generate the discrete-time current sense signal.

In one preferable embodiment, the step of generating the discrete-time current sense signal according to the sampling current includes: converting the sampling current to a conversion sampling current; and sampling and holding the conversion sampling current, to generate the discrete-time current sense signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3:
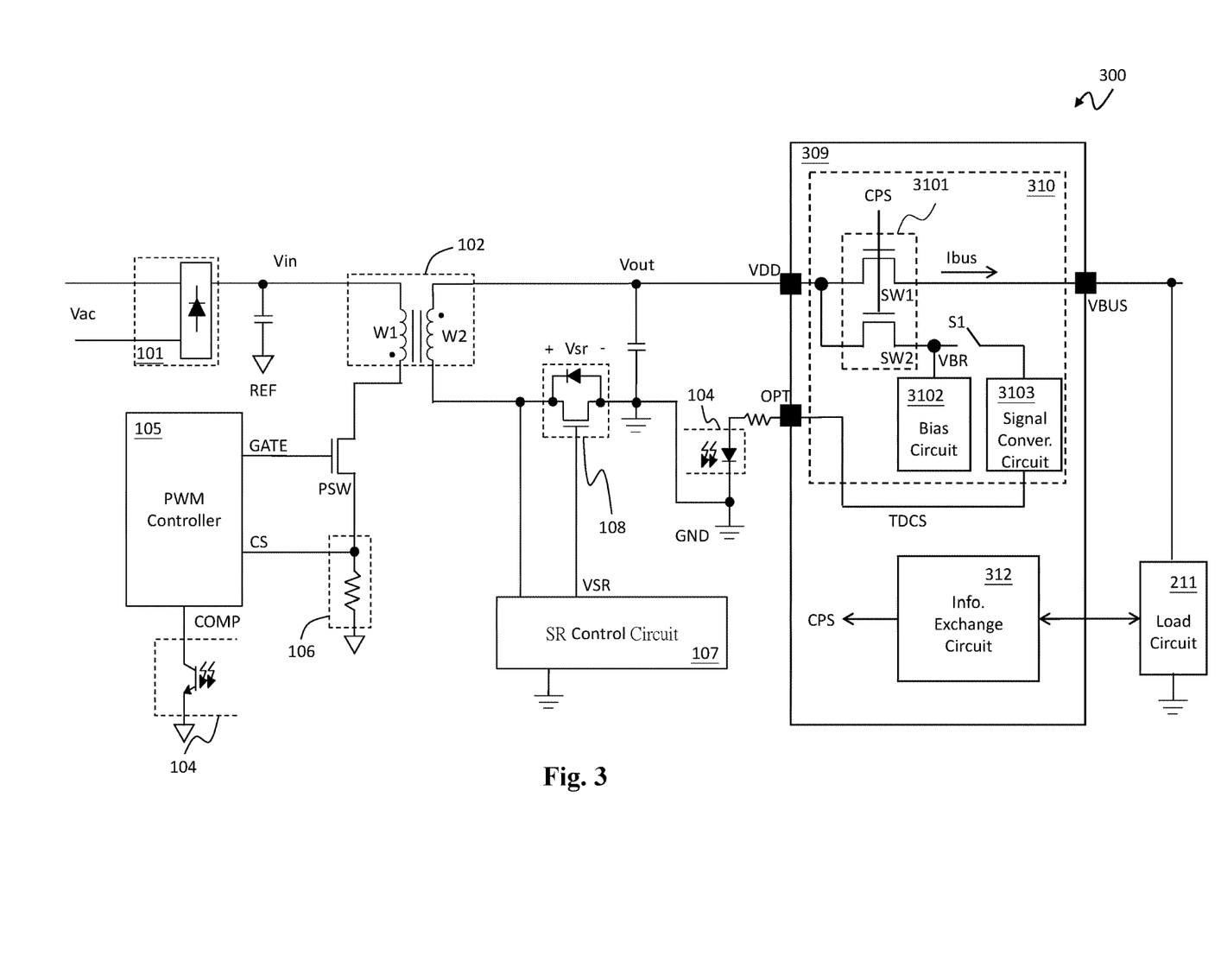
FIG. 3 shows a schematic diagram of a flyback power converter 300 according to the present invention.

FIG. 3 shows a schematic diagram of a flyback power converter 300 according to the present invention. As shown in the figure, the flyback power converter 300 includes a rectifier circuit 101, a transformer 102, a primary power switch PSW, an opto-coupler circuit 104, a pulse width modulation (PWM) controller 105, a primary current sense circuit 106, a synchronous rectifier (SR) control circuit 107, an SR switch circuit 108, and a communication protocol circuit 309.

The transformer 102 has a primary winding W1 and a secondary winding W2, wherein the primary winding W1 is configured to receive an input voltage Vin, and the secondary winding W2 is configured to generate an output voltage Vout. In one embodiment, the rectifier circuit 101 rectifies an alternating current (AC) voltage Vac to generate the input voltage Vin. The primary power switch PSW is coupled to the primary winding W1. The PWM controller 105 is located at a primary side of the transformer 102, and generates a switch control signal GATE which is for example a PWM signal, according to a current sense signal CS and a feedback voltage signal COMP, to control the primary power switch PSW. For better power conversion efficiency, the secondary winding W2 of the flyback power converter 300 is electrically connected to the SR switch circuit 108, wherein the SR switch circuit 108 is controlled by the SR control circuit 107 according to a voltage across the SR switch circuit 108, and as thus, the secondary winding W2 is conductive when the primary winding W1 is non-conductive, to convert the input voltage Vin to the output voltage Vout.

Still referring to FIG. 3, the flyback power converter 300 includes a communication protocol circuit 309. The communication protocol circuit 309 is configured to operably check whether the charging power which is provided by the flyback power converter 300 matches charging power specification and requirement of the load circuit 211 which is for example a rechargeable battery and which is coupled to the communication protocol voltage node VBUS, to avoid damaging the flyback power converter 200 and the load circuit 211. The communication protocol circuit 309 for example conforms to a communication protocol such as USBPD, QC, or PumpExpress, etc.

In one embodiment, in the flyback power converter 300 shown in FIG. 3, the feedback voltage signal COMP is related to a communication protocol current Ibus flowing through a power switch SW1 which is coupled between an internal voltage node VDD of the communication protocol circuit 309 and a communication protocol voltage node VBUS. In one embodiment, when there is no response from the load circuit 211, the communication protocol circuit 309 for example can provide a constant charging power, such as a constant voltage of 5 Volts (V), and a constant current between 0 to 2 Amps (A), to the communication protocol voltage node VBUS.

The communication protocol circuit 309 generates an opto-coupling signal according to a discrete-time current sense signal TDCS at an opto-coupling node OPT. The opto-coupler circuit 104 opto-couples the opto-coupling signal to generate the feedback voltage signal COMP which is sent to the PWM controller 105. The PWM controller 105 generates a switch control signal GATE for operating the primary power switch PSW according to the feedback voltage signal COMP, to convert the input voltage Vin to the output voltage Vout at the internal voltage node VDD, so as to provide the communication protocol current Ibus flowing through the communication protocol circuit 309 between the internal voltage node VDD and the communication protocol voltage node VBUS.

The communication protocol circuit 309 includes a discrete-time current sense circuit 310 and an information exchange circuit 312. The information exchange circuit 312 is configured to operably exchange information related to the communication protocol current Ibus and the output voltage Vout with the load circuit 211, to generate communication protocol signal CPS, to thereby determine whether or not to provide the communication protocol current Ibus to the load circuit 211. The discrete-time current sense circuit 310 is coupled to the information exchange circuit 312, and is configured to operably generate the discrete-time current sense signal TDCS according to the communication protocol current Ibus. The discrete-time current sense circuit 310 includes a current mirror circuit 3101, a bias circuit 3102, a signal conversion circuit 3103, and a first switch S1.

The current mirror circuit 3101 has a power switch SW1 and a sampling switch SW2. The power switch SW1 is coupled between the internal voltage node VDD and the communication protocol voltage node VBUS, and is configured to operate according to the communication protocol signal CPS to provide the communication current Ibus. The sampling switch SW2 is coupled between the internal voltage node VDD and a reference node VBR, and is configured to operably sample the communication protocol current Ibus in a sampling period (for example a period between time points t1 and t2, or time points t3 and t4 as shown in FIG. 4B) in a discrete manner, to generate a sampling current ISEN. The bias circuit 3102 is coupled to the sampling switch SW2, and is configured to operably provide a reference voltage VREF to the reference node VBR in the sampling period according to a communication protocol voltage of the communication protocol voltage node VBUS.

The signal conversion circuit 3103 is coupled to the bias circuit 3102, and is configured to operably generate the discrete-time current sense signal TDCS according to the sampling current ISEN. The first switch S1 is coupled to the sampling switch SW2, and is configured to operate to determine the sampling period (for example a period between time points t1 and t2, or time points t3 and t4 as shown in FIG. 4B). The sampling period is within, and is a part of, a cycle period in which the power switch SW1 provides the communication protocol current Ibus.

The present invention samples the communication protocol current Ibus during the sampling period in a discrete manner; thus, the power consumption can be reduced as compared to the prior art which continuously senses the communication protocol current Ibus. Furthermore, because the present invention samples the communication protocol current Ibus during the sampling period in a discrete manner, the current conversion ratio (for example M:1 as shown in the FIG. 4A) can be reduced to the increase accuracy in sampling the communication protocol current Ibus. For example, the current conversion ratio can be set to M:1=100:1 (as a reference, in the full time sampling, the current conversion ratio is set to M:1=1000:1) to increase the accuracy in sensing the protocol current Ibus, and because the sampling is in a discrete manner, compared with the full time continuous sampling, the power consumption can be greatly reduced, whereby the power conversion efficiency can be increased, and the present invention also reduces the likelihood of system overheat.

Figure 4A:
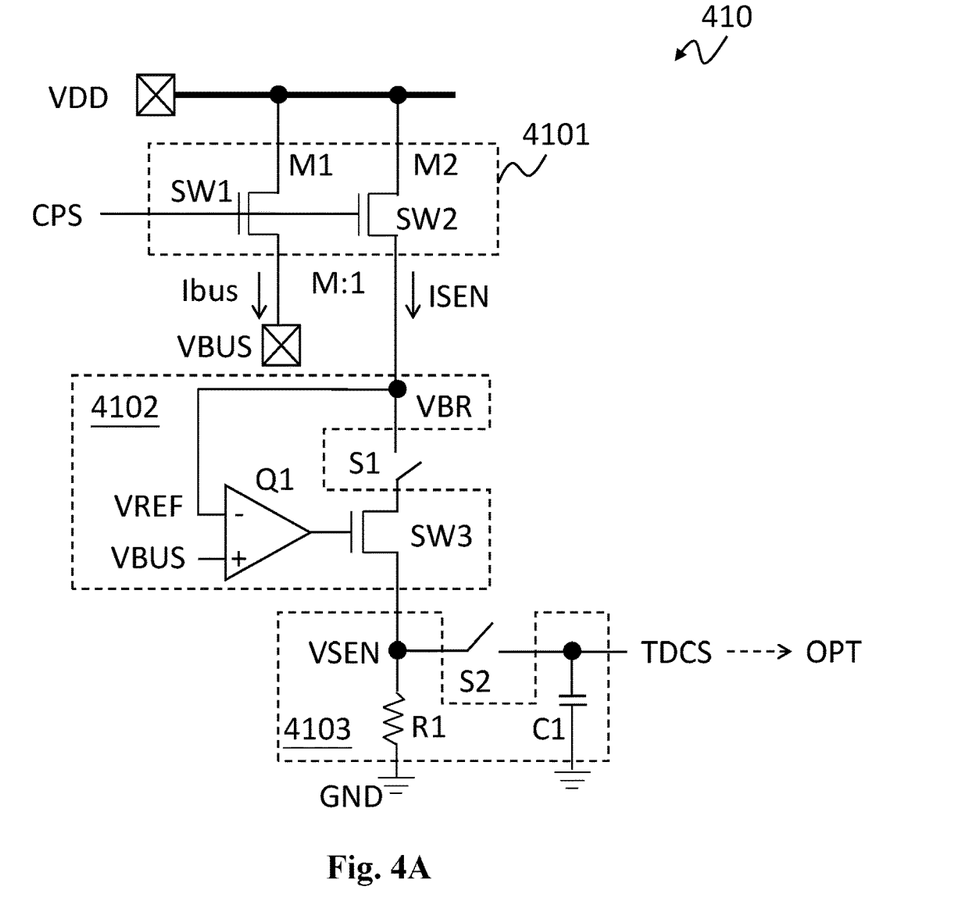
FIGS. 4A and 4B show schematic diagrams of a discrete-time current sense circuit 410 according to the present invention and signal waveforms thereof, respectively.
Figure 4B:
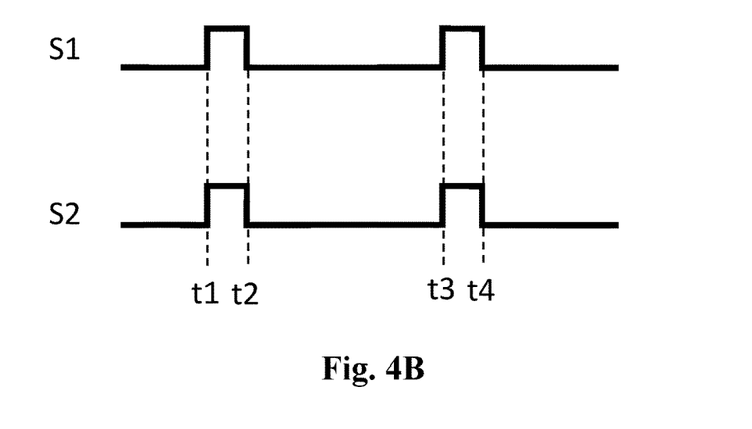

FIGS. 4A and 4B show schematic diagrams of a discrete-time current sense circuit 410 and signal waveforms thereof according to the present invention. FIG. 4A shows a more specific embodiment of the discrete-time current sense circuit 410 which is used in the flyback power converter according to the present invention. As shown in FIG. 4A, the discrete-time current sense circuit 410 includes a current mirror circuit 4101, a bias circuit 4102, a signal conversion circuit 4103, a first switch S1, and a second switch S2.

The current mirror circuit 4101 includes a power switch SW1 and a sampling switch SW2. The power switch SW1 is coupled between the internal voltage node VDD and the communication protocol voltage node VBUS, and is configured to operate according to the communication protocol signal CPS, so as to provide the communication protocol current Ibus. The sampling switch SW2 is coupled between the internal voltage node VDD and the reference node VBR, and is configured to operably sample the communication protocol current Ibus in a sampling period (for example the period between the time points t1 and t2, or the time points t3 and t4 as shown in FIG. 4B) in a discrete manner, to generate the sampling current ISEN.

Note that, the current mirror circuit 4101 is different from a typical current mirror circuit with a diode-connected MOS device. In the typical current mirror circuit, a switch (as the power switch SW1 in this embodiment) adopts an electrical connection with a diode-connected MOS device. In this embodiment, the power switch SW1 does not adopt such an electrical connection with a diode-connected MOS device; instead, this embodiment is arranged in such away that a voltage of a current outflow terminal (connected to the reference node VBR) of the sampling switch SW2 is regulated at a same voltage of the communication protocol voltage node VBUS, to realize current mirror function.

The bias circuit 4102 is coupled to the sampling switch SW2, and is configured to operably provide the reference voltage VREF to the reference node VBR in the sampling period. The signal conversion circuit 4103 is coupled to the bias circuit 4102, and is configured to operably generate the discrete-time current sense signal TDCS according to the sampling current ISEN. The first switch S1 is coupled to the sampling switch SW2, and is configured to operate to determine the sampling period (for example a period between time points t1 and t2, or time points t3 and t4 as shown in FIG. 4B). The sampling period is within and is a part of the complete period in which the power switch SW1 keeps providing the communication protocol current Ibus. In one preferable embodiment, the sampling period is shorter than for example but not limited to one tenth of the complete period.

In this embodiment, the first switch S1 is coupled between the reference node VBR and a switch SW3 of the bias circuit 4102. Different from the discrete-time current sense circuit 310 shown in FIG. 3, the discrete-time current sense circuit 410 further includes the second switch S2. The second switch S2 is coupled to the signal conversion circuit 4103, and is configured to operate to determine whether or not to convert the sampling current ISEN to the discrete-time current sense signal TDCS.

As shown in FIG. 4A, the bias circuit 4102 for example includes an operational amplifier Q1 and a switch SW3. An output terminal of the operational amplifier Q1 controls the switch SW3, to regulate the reference voltage VREF at the reference node VBR to the same voltage of the communication protocol voltage node VBUS in the sampling period by electrically connecting an inverse input terminal of the operational amplifier Q1 to the reference node VBR.

In a preferable embodiment, the signal conversion circuit 4103 for example includes a current-to-voltage conversion circuit (for example but not limited to a resistor R1 shown in the figure) and a sample-and-hold circuit. The current-to-voltage conversion circuit is coupled to the sampling switch SW2, and is configured to operably convert the sampling current ISEN to a sampling voltage VSEN. As shown in the figure, in the sampling period, i.e., the period between time points t1 and t2, or time points t3 and t4 shown in FIG. 4B, the current-to-voltage conversion circuit, i.e., the resistor R1, is coupled between the sampling switch SW2 and a ground level GND, and the sampling current ISEN flows through the resistor R1 to generate the sampling voltage VSEN.

The sample-and-hold circuit, for example but not limited to a capacitor C1 shown in FIG. 4A, is coupled to the current-to-voltage conversion circuit, and is configured to operably sample and hold the sampling voltage VSEN, to generate the discrete-time current sense signal TDCS, and the communication protocol circuit 309 generates the opto-coupling signal at the opto-coupling node OPT according to the discrete-time current sense signal TDCS. The opto-coupler circuit 104 opto-couples the opto-coupling signal to generate the feedback voltage signal COMP to the PWM controller 105.

Figure 5A:
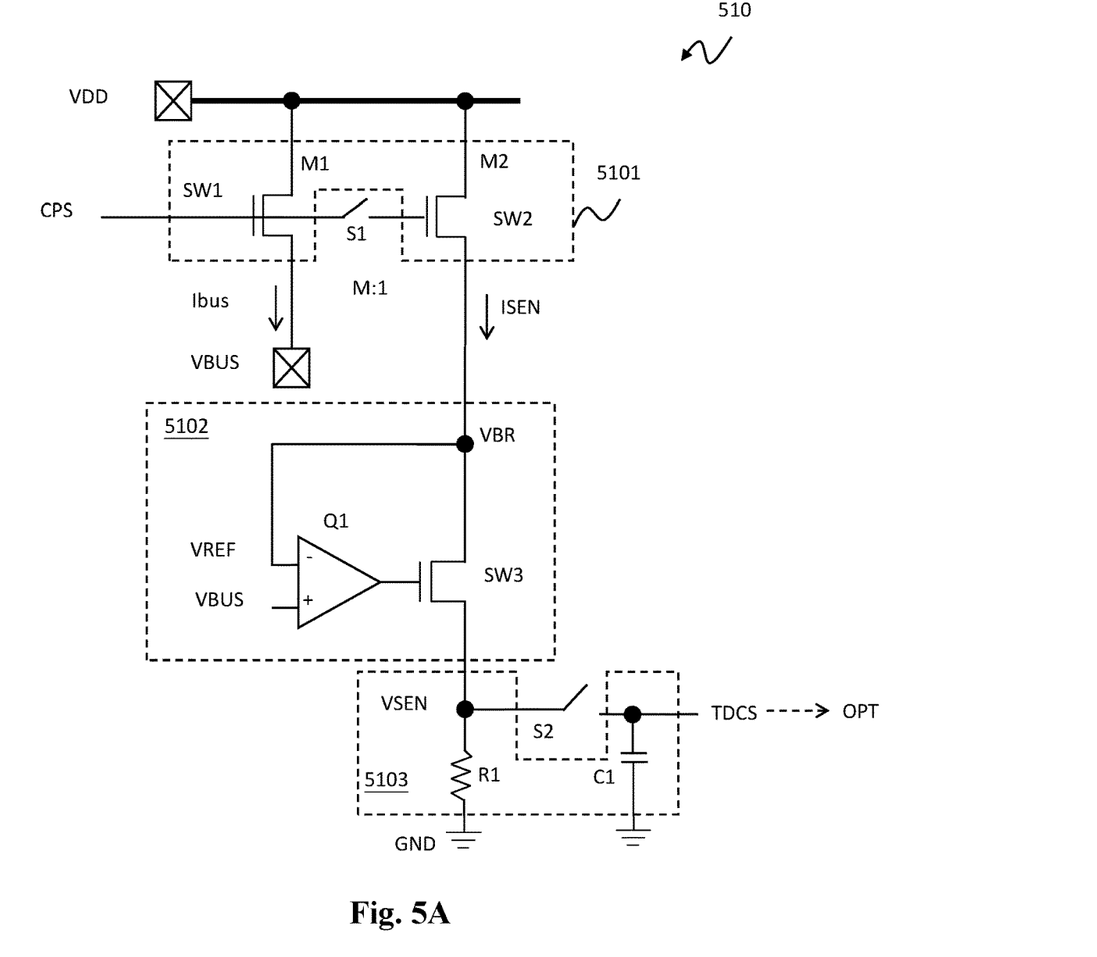
FIGS. 5A and 5B show schematic diagrams of a discrete-time current sense circuit 510 according to the present invention and signal waveforms thereof, respectively.
Figure 5B:
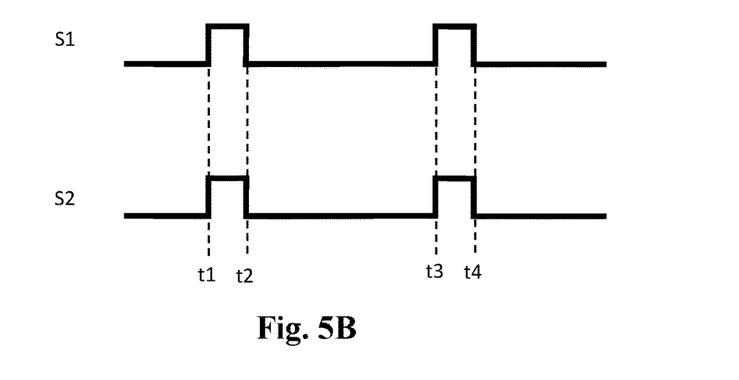

FIGS. 5A and 5B show schematic diagrams of a discrete-time current sense circuit 510 and signal waveforms thereof according to the present invention. FIG. 5A shows a more specific embodiment of the discrete-time current sense circuit 510 which is used in the flyback power converter according to the present invention. As shown in FIG. 5A, the discrete-time current sense circuit 510 includes a current mirror circuit 5101, a bias circuit 5102, a signal conversion circuit 5103, the first switch S1, and the second switch S2.

The current mirror circuit 5101 includes the power switch SW1 and the sampling switch SW2. The power switch SW1 is coupled between the internal voltage node VDD and the communication protocol voltage node VBUS, and is configured to operate according to the communication protocol signal CPS, so as to provide the communication protocol current Ibus. The sampling switch SW2 is coupled between the internal voltage node VDD and the reference node VBR, and is configured to operably sample the communication protocol current Ibus in the sampling period (for example the period between the time points t1 and t2, or the time points t3 and t4 as shown in FIG. 5B) in a discrete manner, to generate the sampling current ISEN.

The bias circuit 5102 is coupled to the sampling switch SW2, and is configured to operably provide the reference voltage VREF to the reference node VBR in the sampling period. The signal conversion circuit 5103 is coupled to the bias circuit 5102, and is configured to operably generate the discrete-time current sense signal TDCS according to the sampling current ISEN. The first switch S1 is coupled to the sampling switch SW2, and is configured to operate to determine the sampling period (for example a period between time points t1 and t2, or time points t3 and t4 as shown in FIG. 5B). The sampling period is within and is a part of the complete period in which the power switch SW1 keeps providing the communication protocol current Ibus. In one preferable embodiment, the sampling period is shorter than for example but not limited to one tenth of the complete period.

This embodiment is different from the embodiment shown in FIG. 4A in that, in this embodiment, the first switch S1 is coupled between the power switch SW1 and the sampling switch SW2. The function of the first switch S1 is the same as the function of the first switch S1 shown in FIG. 4A, and both the first switches S1 operate to determine the sampling period.

Figure 6A:
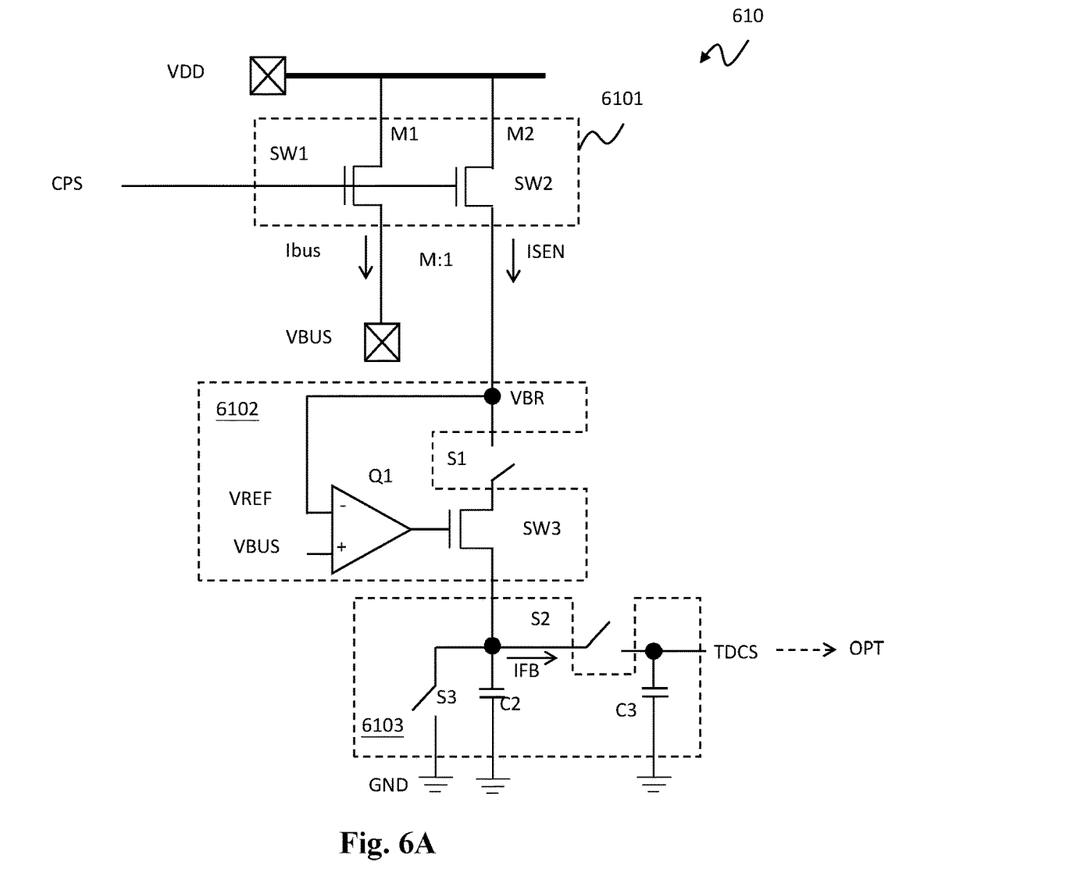
FIGS. 6A and 6B show schematic diagrams of a discrete-time current sense circuit 610 according to the present invention and signal waveforms thereof, respectively.
Figure 6B:
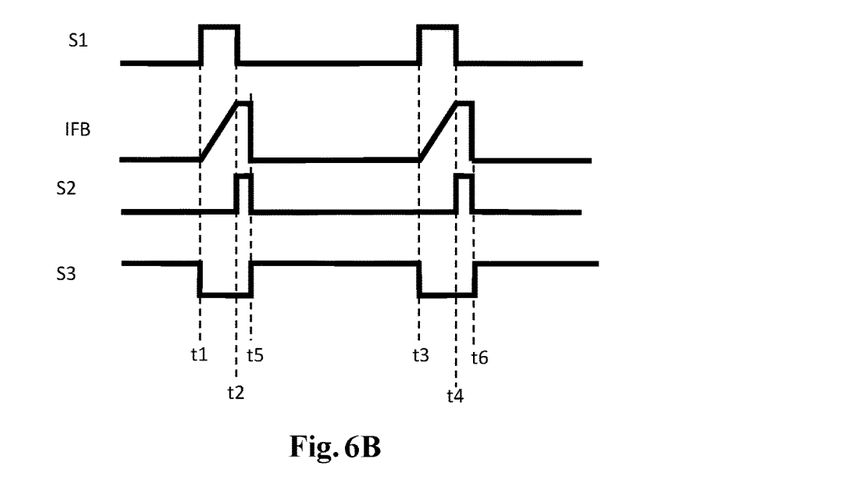

FIGS. 6A and 6B show schematic diagrams of a discrete-time current sense circuit 610 and signal waveforms thereof according to the present invention. FIG. 6A shows a more specific embodiment of the discrete-time current sense circuit 610 which is used in the flyback power converter according to the present invention. As shown in FIG. 6A, the discrete-time current sense circuit 610 includes a current mirror circuit 6101, a bias circuit 6102, a signal conversion circuit 6103, the first switch S1, and the second switch S2.

The current mirror circuit 6101 includes the power switch SW1 and the sampling switch SW2. The power switch SW1 is coupled between the internal voltage node VDD and the communication protocol voltage node VBUS, and is configured to operate according to the communication protocol signal CPS, so as to provide the communication protocol current Ibus. The sampling switch SW2 is coupled between the internal voltage node VDD and the reference node VBR, and is configured to operably sample the communication protocol current Ibus in the sampling period (for example the period between the time points t1 and t2, or the time points t3 and t4 as shown in FIG. 6B) in a discrete manner, to generate the sampling current ISEN.

The bias circuit 6102 is coupled to the sampling switch SW2, and is configured to operably provide the reference voltage VREF to the reference node VBR in the sampling period. The signal conversion circuit 6103 is coupled to the bias circuit 6102, and is configured to operably generate the discrete-time current sense signal TDCS according to the sampling current ISEN. The first switch S1 is coupled to the sampling switch SW2, and is configured to operate to determine the sampling period (for example a period between time points t1 and t2, or time points t3 and t4 as shown in FIG. 6B). The sampling period is within, and is a part of, the complete period in which the power switch SW1 keeps providing the communication protocol current Ibus. In one preferable embodiment, the sampling period is shorter than for example but not limited to one tenth of the complete period.

This embodiment is different from the embodiment shown in FIG. 4A in that, in this embodiment, the current-to-voltage conversion circuit of the signal conversion circuit 6103 includes a switch S3 and a capacitor C2. In the sampling period, the switches S2 and S3 are nonconductive, and the sampling current ISEN charges the capacitor C2. In periods after the sampling period, e.g. between time points t2 and t5, and time points t4 and t6, the switch S2 is conductive and the switch S3 is kept nonconductive, whereby a current IFB charges the capacitor C3 (i.e., a sample-and-hold circuit of the signal conversion circuit 6103), to generate the discrete-time current sense signal TDCS.

Figure 7A:
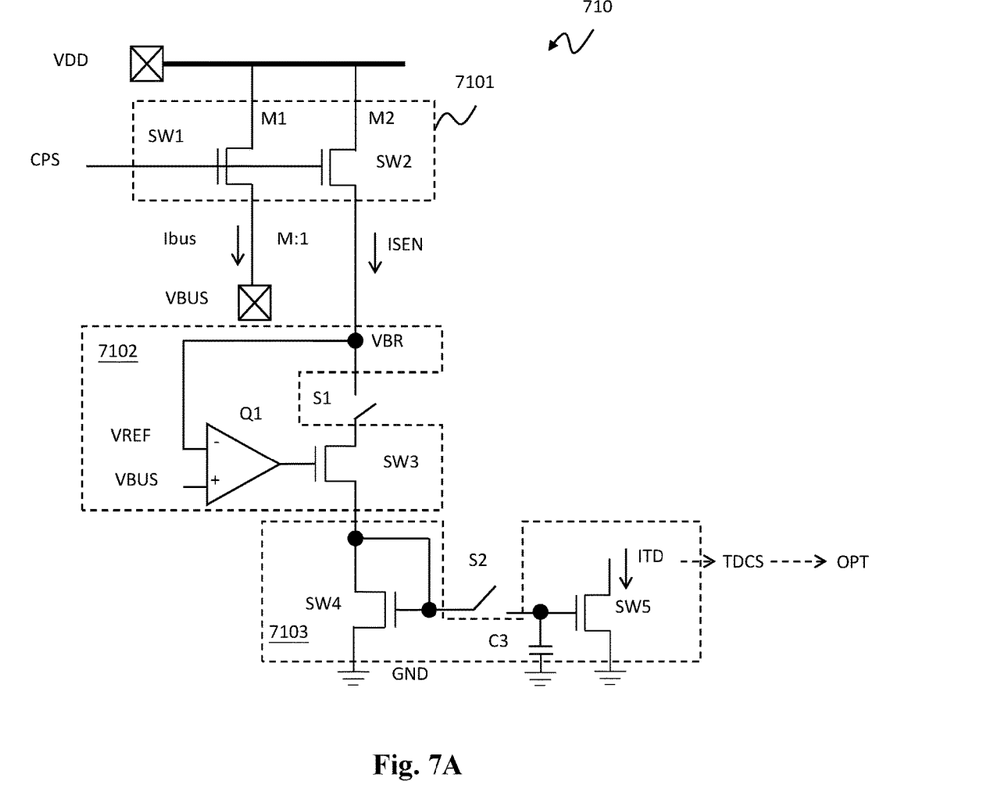
FIGS. 7A and 7B show schematic diagrams of a discrete-time current sense circuit 710 according to the present invention and signal waveforms thereof, respectively.
Figure 7B:
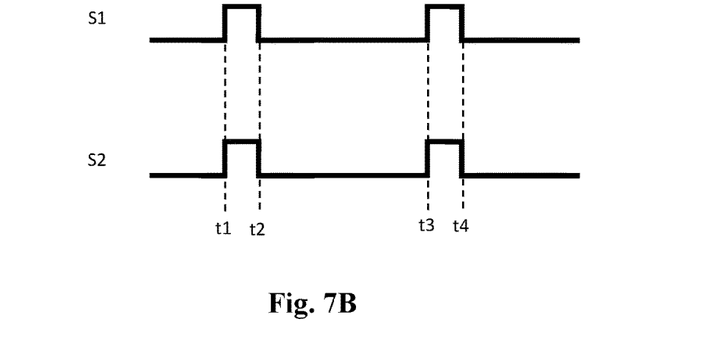

FIGS. 7A and 7B show schematic diagrams of a discrete-time current sense circuit 710 and signal waveforms thereof according to the present invention. FIG. 7A shows a more specific embodiment of the discrete-time current sense circuit 710 which is used in the flyback power converter according to the present invention. As shown in FIG. 7A, the discrete-time current sense circuit 710 includes a current mirror circuit 7101, a bias circuit 7102, a signal conversion circuit 7103, the first switch S1, and a second switch S2.

The current mirror circuit 7101 includes the power switch SW1 and the sampling switch SW2. The power switch SW1 is coupled between the internal voltage node VDD and the communication protocol voltage node VBUS, and is configured to operate according to the communication protocol signal CPS, so as to provide the communication protocol current Ibus. The sampling switch SW2 is coupled between the internal voltage node VDD and the reference node VBR, and is configured to operably sample the communication protocol current Ibus in the sampling period (for example the period between the time points t1 and t2, or the time points t3 and t4 as shown in FIG. 7B) in a discrete manner, to generate the sampling current ISEN.

The bias circuit 7102 is coupled to the sampling switch SW2, and is configured to operably provide the reference voltage VREF to the reference node VBR in the sampling period. The signal conversion circuit 7103 is coupled to the bias circuit 7102, and is configured to operably generate the discrete-time current sense signal TDCS according to the sampling current ISEN. The first switch S1 is coupled to the sampling switch SW2, and is configured to operate to determine the sampling period (for example a period between time points t1 and t2, or time points t3 and t4 as shown in FIG. 7B). The sampling period is within, and is a part of, the complete period in which the power switch SW1 keeps providing the communication protocol current Ibus. In one preferable embodiment, the sampling period is shorter than for example but not limited to one tenth of the complete period.

This embodiment is different from the embodiment shown in FIG. 4A in that, in this embodiment, the signal conversion circuit 7103 includes a signal conversion current mirror circuit (for example, the signal conversion current mirror circuit includes a switch SW4 and a switch SW5 as shown in FIG. 7A) and a sample-and-hold circuit (such as a capacitor C3 shown in FIG. 7A). The signal conversion current mirror circuit is coupled to the sampling switch SW2, and is configured to operably convert the sampling current ISEN to a conversion sampling current ITD. The sample-and-hold circuit is coupled to the signal conversion current mirror circuit, and is configured to operably sample and hold the conversion sampling current ITD, to generate the discrete-time current sense signal TDCS.

More specifically, the conversion sampling current ITD is determined by a gate-source voltage (Vgs) of the switch SW5. In the sampling period, the switch S2 is conductive, and the sampling current ISEN determines the gate-source voltage (Vgs) of the switch SW4, i.e., the diode-connected MOS device as shown in FIG. 7A, and the gate-source voltage (Vgs) of the switch SW5. Thus, the communication protocol current Ibus determines the conversion sampling current ITD. In a preferable embodiment, the conversion sampling current ITD is proportional to the communication protocol current Ibus. When the switch S2 is nonconductive, the gate-source voltage (Vgs) of the switch SW5 is maintained by the capacitor C3, and thus the conversion sampling current ITD and the discrete-time current sense signal TDCS related to the conversion sampling current ITD are maintained too. In a preferable embodiment, the conversion sampling current ITD is equal to the discrete-time current sense signal TDCS.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, the current mirror circuit is not limited to the MOS transistors as shown in the embodiments hereinbefore, and can be replaced by other types of switches such as BJT or JFET. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A communication protocol circuit for use in a flyback power converter, the communication protocol circuit comprising: an information exchange circuit, which is configured to operably exchange information with a load circuit, to generate a communication protocol signal, to thereby determine whether or not to provide a communication protocol current to the load circuit; and a discrete-time current sense circuit, which is coupled to the information exchange circuit, and is configured to operably generate a discrete-time current sense signal according to the communication protocol current; wherein the flyback power converter is configured to operably convert an input voltage to an output voltage according to the discrete-time current sense signal; wherein the discrete-time current sense circuit includes: a current mirror circuit, which includes: a power switch, which is coupled between an internal voltage node and a communication protocol voltage node, and is configured to operably provide the communication protocol current; and a sampling switch, which is coupled between the internal voltage node and a reference node, and is configured to operably sample the communication protocol current in a sampling period in a discrete manner, to generate a sampling current; a bias circuit, which is coupled to the sampling switch, and is configured to operably provide a reference voltage to the reference node in the sampling period according to a communication protocol voltage of the communication protocol voltage node; a signal conversion circuit, which is coupled to the bias circuit, and is configured to operably generate the discrete-time current sense signal according to the sampling current; and a first switch, which is coupled to the sampling switch, and communication current is within, and is a part of, a complete period in which the power switch provides the communication protocol current.

2. The communication protocol circuit of claim 1, wherein the discrete-time current sense circuit further includes a second switch, which is coupled to the signal conversion circuit, and is configured to operate to determine whether or not to convert the sampling current to the discrete-time current sense signal.

3. The communication protocol circuit of claim 1, wherein the reference voltage is equal to the communication protocol voltage.

4. The communication protocol circuit of claim 1, wherein the signal conversion circuit includes:

a current-to-voltage conversion circuit, which is coupled to the sampling switch, and is configured to operably convert the sampling current to a sampling voltage; and
a sample-and-hold circuit, which is coupled to the current-to-voltage conversion circuit, and is configured to operably sample and hold the sampling voltage, to generate the discrete-time current sense signal.

5. The communication protocol circuit of claim 1, wherein the signal conversion circuit includes:
a signal conversion current mirror circuit, which is coupled to the sampling switch, and is configured to operably convert the sampling current to a conversion sampling current; and
a sample-and-hold circuit, which is coupled to the signal conversion current mirror circuit, and is configured to operably sample and hold the conversion sampling current, to generate the discrete-time current sense signal.

6. A discrete-time current sense circuit for use in a communication protocol circuit, wherein the communication protocol circuit for use in a flyback power converter, and the communication protocol circuit includes an information exchange circuit, which is configured to operably exchange information with a load circuit, to generate a communication protocol signal, to thereby determine whether or not to provide a communication protocol current to the load circuit; and the discrete-time current sense circuit, which is coupled to the information exchange circuit, and is configured to operably generate a discrete-time current sense signal according to the communication protocol current; wherein the flyback power converter is configured to operably convert an input voltage to an output voltage according to the discrete-time current sense signal, and provide the communication protocol current; the discrete-time current sense circuit comprising: a current mirror circuit, which includes: a power switch, wherein the power switch is coupled between an internal voltage node and a communication protocol voltage node, and is configured to operably provide the communication protocol current; and a sampling switch, which is coupled between the internal voltage node and a reference node, and is configured to operably sample the communication protocol current in a sampling period in a discrete manner, to generate a sampling current; a bias circuit, which is coupled to the sampling switch, and is configured to operably provide a reference voltage to the reference node in the sampling period according to a communication protocol voltage of the communication protocol voltage node; a signal conversion circuit, which is coupled to the bias circuit, and is configured to operably generate the discrete-time current sense signal according to the sampling current; and a first switch, which is coupled to the sampling switch, and is configured to operate to determine the sampling period; wherein the sampling period is within, and is a part of, a complete period in which the power switch provides the communication protocol current.

7. The discrete-time current sense circuit of claim 6, further comprising a second switch, which is coupled to the signal conversion circuit, and is configured to operate to determine whether or not to convert the sampling current to the discrete-time current sense signal.

8. The discrete-time current sense circuit of claim 6, wherein the reference voltage is equal to the communication protocol voltage.

9. The discrete-time current sense circuit of claim 6, wherein the signal conversion circuit includes:

a current-to-voltage conversion circuit, which is coupled to the sampling switch, and is configured to operably convert the sampling current to a sampling voltage; and a sample-and-hold circuit, which is coupled to the current-to-voltage conversion circuit, and is configured to operably sample and hold the sampling voltage, to generate the discrete-time current sense signal.

10. The discrete-time current sense circuit of claim 6, wherein the signal conversion circuit includes:

a signal conversion current mirror circuit, which is coupled to the sampling switch, and is configured to operably convert the sampling current to a conversion sampling current; and a sample-and-hold circuit, which is coupled to the signal conversion current mirror circuit, and is configured to operably sample and hold the conversion sampling current, to generate the discrete-time current sense signal.

11. A discrete-time current sense method for use in a communication protocol circuit, comprising:

sampling a communication protocol current in a sampling period in a discrete manner, to generate a sampling current, wherein the communication protocol current is provided by a power switch which is coupled between an internal voltage node and a communication protocol voltage node;

providing a reference voltage to a reference node in the sampling period according to a communication protocol voltage of the communication protocol voltage node, wherein the sampling current flows through the reference node;

generating a discrete-time current sense signal according to the sampling current; and operating a first switch to determine the sampling period;

wherein the sampling period is within, and is a part of, a complete period in which the power switch provides the communication protocol current.

12. The discrete-time current sense method of claim 11, further comprising operating a second switch to determine whether or not to convert the sampling current to the discrete-time current sense signal.

13. The discrete-time current sense method of claim 11, wherein the reference voltage is equal to the communication protocol voltage.

14. The discrete-time current sense method of claim 11, wherein the step of generating the discrete-time current sense signal according to the sampling current includes:

converting the sampling current to a sampling voltage; and sampling and holding the sampling voltage, to generate the discrete-time current sense signal.

15. The discrete-time current sense method of claim 11, wherein the step of generating the discrete-time current sense signal according to the sampling current includes:

converting the sampling current to a conversion sampling current; and sampling and holding the conversion sampling current, to generate the discrete-time current sense signal.

* * * * *